(12) United States Patent
Ayabakan et al.

(10) Patent No.: US 10,348,031 B2
(45) Date of Patent: Jul. 9, 2019

(54) APPARATUS FOR FITTING CABLES WITH CABLE SLEEVES

(71) Applicant: SCHLEUNIGER HOLDING AG, Thun (CH)

(72) Inventors: Mustafa Ayabakan, Wuppertal (DE); Uwe Keil, Hueckeswagen (DE); Gerhard Woitke, Wermelskirchen (DE); Martin Stier, Werne (DE); Eugen Wosinski, Pfaeffikon (CH)

(73) Assignee: SCHLEUNIGER HOLDING AG, Thun (CH)

( * ) Notice: Subject to any disclaimer, the term of this patent is extended or adjusted under 35 U.S.C. 154(b) by 140 days.

(21) Appl. No.: 15/593,399

(22) Filed: May 12, 2017

(65) Prior Publication Data

US 2017/0250496 A1 Aug. 31, 2017

Related U.S. Application Data

(62) Division of application No. 14/348,050, filed as application No. PCT/IB2012/054437 on Aug. 29, 2012, now Pat. No. 9,653,865.

(Continued)

(30) Foreign Application Priority Data

Sep. 29, 2011 (EP) .................................... 11183331

(51) Int. Cl.
*B23P 21/00* (2006.01)
*H01R 13/52* (2006.01)
(Continued)

(52) U.S. Cl.
CPC ........ *H01R 13/5205* (2013.01); *G01L 5/0038* (2013.01); *G01L 5/0076* (2013.01);
(Continued)

(58) Field of Classification Search
CPC .............. H01R 13/5205; H01R 13/635; Y10T 29/49002; Y10T 29/49004;
(Continued)

(56) References Cited

U.S. PATENT DOCUMENTS 4,521,946 A 6/1985 Dusel et al.
4,586,768 A 5/1986 Eck
(Continued)

FOREIGN PATENT DOCUMENTS

CA 2254017 A1 5/2000
DE 19901439 C1 2/2000
(Continued)

OTHER PUBLICATIONS

International Search Report and International Preliminary Report on Patentability for corresponding PCT Application No. PCT/IB2012/054437, dated Feb. 4, 2013.

(Continued)

*Primary Examiner* — Thiem D Phan
(74) *Attorney, Agent, or Firm* — Matthew B. Dernier, Esq.

(57) ABSTRACT

A cable fitting transfer unit includes a holding arbor configured to accommodate cable fittings thereon; a conveyor configured to transport cable fittings to the holding arbor; a cable fitting fitter configured to receive cable fittings from the holding arbor; and, a force transducer operatively connected to measure accommodation force in the holding arbor during the accommodation of cable fittings, the force transducer being situated at the holding arbor.

9 Claims, 20 Drawing Sheets

Related U.S. Application Data

(60) Provisional application No. 61/541,058, filed on Sep. 29, 2011.

(51) Int. Cl.
  *G01L 5/00* (2006.01)
  *H01R 43/00* (2006.01)
  *H01R 43/28* (2006.01)
  *H01R 9/05* (2006.01)
  *H01R 13/66* (2006.01)
  *H02G 15/08* (2006.01)

(52) U.S. Cl.
  CPC ....... *H01R 9/0521* (2013.01); *H01R 13/6683* (2013.01); *H01R 43/005* (2013.01); *H01R 43/28* (2013.01); *H02G 15/08* (2013.01); *Y10T 29/49004* (2015.01); *Y10T 29/53022* (2015.01); *Y10T 29/53213* (2015.01)

(58) Field of Classification Search
  CPC ......... Y10T 29/49174; Y10T 29/49194; Y10T 29/53022; G02B 6/387; G02B 6/4444; H02G 3/0616
  USPC ......... 29/705, 593, 407.01, 407.1, 721, 748, 29/793, 857, 868, 235, 255, 703, 717, 29/754
  See application file for complete search history.

(56) References Cited

U.S. PATENT DOCUMENTS

| | | | |
|---|---|---|---|
| 4,653,182 A | 3/1987 | Fukuda et al. | |
| 5,016,346 A | 5/1991 | Gerst et al. | |
| 5,063,656 A | 11/1991 | Hirano et al. | |
| 5,284,001 A | 2/1994 | Ochs | |
| 5,315,757 A | 5/1994 | Koch et al. | |
| 5,333,374 A | 8/1994 | Pittau | |
| 5,392,505 A | 2/1995 | Harada | |
| 5,432,996 A | 7/1995 | Imgut et al. | |
| 5,456,148 A | 10/1995 | Hoffa | |
| 5,465,478 A | 11/1995 | Anderson et al. | |
| 5,732,750 A | 3/1998 | Soriano | |
| 5,913,553 A | 6/1999 | Takada | |
| 5,937,505 A | 8/1999 | Strong et al. | |
| 6,098,275 A | 8/2000 | Wuyts et al. | |
| 6,276,564 B1 | 8/2001 | Reich | |
| 6,336,267 B1 | 1/2002 | Hoffa | |
| 6,418,769 B1* | 7/2002 | Schreiner | H01R 43/0486 29/705 |
| 6,722,025 B2 | 4/2004 | Bohmer | |
| 6,738,134 B2 | 5/2004 | Maeda | |
| 6,763,574 B1 | 7/2004 | Woll | |
| 6,990,730 B2 | 1/2006 | Fujita et al. | |
| 7,047,618 B2 | 5/2006 | Hunter | |
| 7,363,703 B2 | 4/2008 | Imgrut | |
| 8,671,538 B2* | 3/2014 | Ayabakan | H01R 43/0486 29/407.01 |
| 2003/0079342 A1 | 5/2003 | Revel et al. | |
| 2005/0108872 A1 | 5/2005 | Konrath et al. | |
| 2013/0104391 A1 | 5/2013 | Wosinski | |

FOREIGN PATENT DOCUMENTS

| | | |
|---|---|---|
| EP | 0410416 A2 | 1/1991 |
| EP | 0462923 B1 | 12/1991 |
| EP | 0410416 A3 | 1/1993 |
| EP | 0533045 A2 | 3/1993 |
| EP | 0533045 A3 | 7/1993 |
| EP | 0626738 A1 | 11/1994 |
| EP | 0730326 A2 | 9/1996 |
| EP | 0730326 A3 | 7/1997 |
| EP | 0626738 B1 | 12/1997 |
| EP | 0881720 B1 | 9/2002 |
| EP | 1022821 B1 | 1/2004 |
| EP | 1912296 A1 | 4/2008 |
| EP | 1689049 B1 | 11/2008 |
| GB | 412859 A | 7/1934 |
| GB | 1379964 A | 1/1975 |
| JP | H09171878 A | 6/1997 |
| JP | 2000184542 A | 6/2000 |
| JP | 2004014278 A | 1/2004 |
| JP | 2005166297 A | 6/2005 |
| JP | 2009042022 A | 2/2009 |
| WO | 2011158145 A | 12/2011 |

OTHER PUBLICATIONS

Search Report and Written Opinion for corresponding EP Application No. EP11183331, dated Mar. 30, 2012.
Office Action for corresponding U.S. Appl. No. 14/348,050 7 pages, dated Sep. 29, 2016.

* cited by examiner

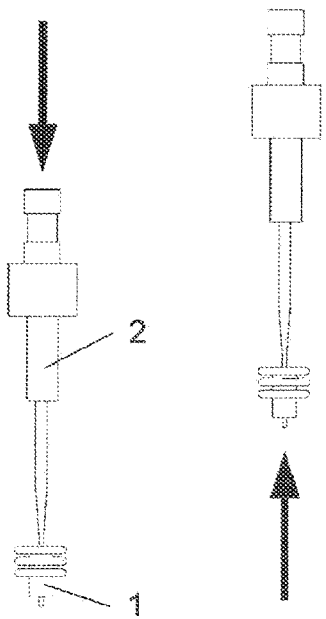
Fig. 1A
Fig. 1B
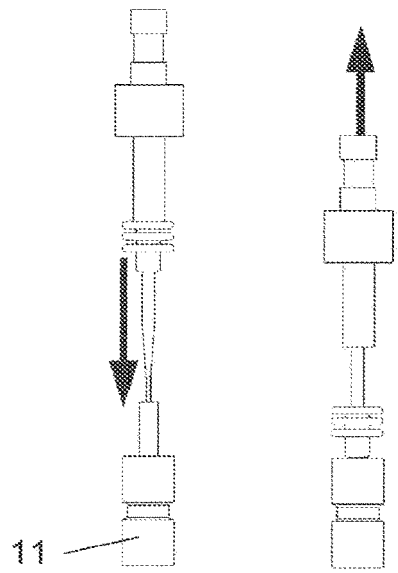
Fig. 1C
Fig. 1D

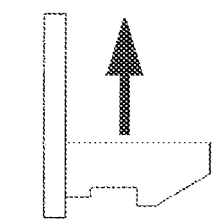
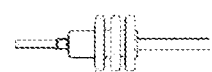
Fig. 1J
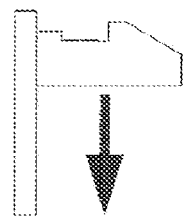
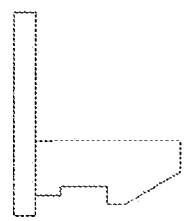
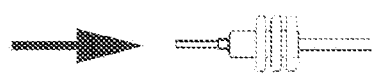
Fig. 1K
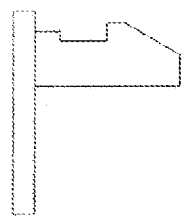

APPARATUS FOR FITTING CABLES WITH CABLE SLEEVES

CROSS REFERENCE TO RELATED APPLICATIONS

This is a divisional application of U.S. patent application Ser. No. 14/348,050, filed Jun. 16, 2014, issued as U.S. Pat. No. 9,653,865, which is a 35 U.S.C. 371 national-phase entry of PCT International application no. PCT/IB2012/054437 filed on Aug. 29, 2012, and also claims benefit of priority to prior European application no. EP11183331 filed on Sep. 29, 2011, and also claims priority as a non-provisional of U.S. provisional application Ser. No. 61/541,058 filed on Sep. 29, 2011, and both European application no. EP11183331 and U.S. provisional application Ser. No. 61/541,058, as well as parent PCT International application no. PCT/IB2012/054437, are all incorporated herein by reference in their entireties for all intents and purposes, all as if identically set forth in full herein.

BACKGROUND

The invention relates to a method for fitting cables with cable sleeves, and to a transfer unit.

A cable sleeve or "seal" is a complex plastic ring with several radial expansions ("shoulders"), which is slipped over an insulated cable harness, and seals the cable harness (e.g., a multi-core strand) or each individual cable of a cable harness with one or more crimped-on contacts against the penetration of liquid and contaminants.

The process of mounting seals on cables in cable processing plants is today fully automated. In particular, there are also largely autonomous and compact processing stations with standardized interfaces, that execute the process of fitting cables with seals as part of a multistage, fully automated cable processing routine (e.g., stripping before and crimping after seal assembly), and make it possible to modularly expand all automated cable processors available on the market with an additional seal fitting station.

The main processing steps involved in the typical machining of seals include: a.) conveying them out of a storage container onto a conveyor (conveyor belt, conveyor rail); b.) separating and orienting them on the conveyor; c.) accommodating them on a holding arbor from the conveyor; d) slipping them onto an assembly pipe; e) guiding them on the assembly pipe over the cable to be fitted; f) and, stripping them from the assembly pipe onto the cable. Published European patent application EP0410416A2 discloses a method wherein a leading bung seal in a magazine is picked up by a bung seal transfer clamp and is positioned between a bung seal receptacle and a bung seal transfer device, which are axially aligned. A bung seal expansion pin is advanced to drive the leading bung seal into the bung seal receptacle, to force it against a resilient grommet therein, and to extend through the bung seal so as to expand it. A bung seal expansion sleeve surrounding the expansion pin is then advanced further to expand the bung seal and the pin is withdrawn leaving the bung seal secured to the expansion sleeve by its own resilience. A lead is then inserted into the expansion sleeve, and the expansion sleeve is then withdrawn, leaving the seal secured to the lead, by its own resilience, after which the bung seal receptacle is opened and the lead with the bung seal thereon is removed to a station at which an electrical terminal is crimped to the lead and to the bung seal.

In order to avoid processing mistakes in this process chain to the greatest extent possible, fault-prone subprocesses are often subjected to fully automated monitoring while processing the seals.

Prior art discloses, in particular, optical monitoring devices (e.g., photoelectric barriers or digital cameras with evaluation electronics) for achieving this objective. For example, in seal stations readily available on the market, a photoelectric barrier checks for the presence of a seal in the position where it is accommodated via the conveyor at a specific point in time or during a specific period within the work cycle time interval. If no seal is detected in the accommodation position, the fitting process is stopped.

Seal orientation is also important for the correct accommodation of a seal via the conveyor, and hence is sometimes monitored.

In the absence of such monitoring, any process errors that arise in this process stage may lead to difficulties as subsequent procedural steps run their course, or yield a seal-fitted cable that does not satisfy the stringent quality requirements set forth in the relevant standards as the end product of the seal fitting process or entire cable processing routine. A cable faultily processed in this way usually ends up as scrap. This not only represents a cost factor, but may also be associated with logistical problems.

The orientation of a seal is understood as the alignment of its axis running centrally through its middle tunnel. This axial direction is adjusted in a seal while conveying it into the accommodation position in such a way that, in the accommodation position, it is preferably parallel to the main axis of the holding arbor provided for accommodating the seal via the conveyor. During proper operation, the seal is oriented and positioned on the conveyor in such a way that the holding arbor punches centrally through the seal during a forward stroke along the tunnel/bore axis of the seal in order to accommodate the seal.

In contrast, the term "orienting a seal on the holding arbor" as used in the following assesses the orientation of a seal generally defined above. If the seal is centrally punched through by the holding arbor along the tunnel axis of the seal during its forward stroke, the seal orientation on the holding arbor is regarded as "correct", otherwise as "incorrect".

Assuming that a seal is present in the accommodation position, primarily the following fault scenarios are possible while accommodating a seal, which lead to an erroneous orientation of the seal on the holding arbor in the sense just established:

1) The holding arbor collides with the seal from outside, and maximally penetrates far enough into the jacket body of the seal that the seal does not get caught in the holding arbor. The seal is instead only crimped from outside from the effect exerted by the forward stroke of the holding arbor, with any potential damage only being done to the exterior. In the process, it is
   a) either jammed by the holding arbor and remains in the accommodation area of the conveyor, or
   b) forced or catapulted out of the accommodation position by the holding arbor and lost, possibly disrupting the process at another location.
2) During its forward stroke, the holding arbor at least partially penetrates far enough into the jacket body of the seal that the seal gets caught in the holding arbor. A distinction must here be made between the two cases, in that the holding arbor:
   a) either penetrates into the incorrectly oriented seal from outside, or, b) after partially introduced into the tunnel of the seal, penetrates or punches through the jacket body of the latter from inside.

In all of these errors, the seal already may not be processable further in light of the high probability that the sealing lips of the seal arranged on the inside have become damaged, or the seal no longer satisfies the stringent tightness requirements due to exterior damages. Preventing damages is a common task in most technical fields, as may be observed from, e.g., US 2003/079342 A1. This document discloses a wire manipulator which includes a body with a jack for moving clamping arms to hold a wire extremity insert the extremity in an alveolus of a connector. The insertion force is sensed by a force sensor in the clamping arms and is compared with a reference force to stop the insertion process to avoid damage to the wire, the connector and the manipulator.

The mentioned procedural errors stem from a deficiently aligned seal in the accommodation position on the conveyor. Operators have until now subjected the seal accommodation to occasional visual monitoring so as to be able to respond as directly as possible thereto, even though having to interrupt the process. This personal monitoring Is expensive and unproductive.

Another monitoring procedure involving a photoelectric barrier according to prior art checks the seal in the accommodation position, and is associated with other disadvantages.

While the photoelectric barrier is sufficient for monitoring the presence of a seal in the accommodation position, it provides no information about the correct positioning (location) and orientation of the seal. In general, several photoelectric barriers are needed to monitor the correct positioning and orientation. However, this variant is technically complex, inelegant, and of less robustness. It also delays the overall process of fitting cables with varying seals, since additional setup time must be expended to adjust the position of the photoelectric barriers during each switch between two different seal types.

Monitoring with a digital camera leads to digital snapshots, and analyzing the relevant details of the latter is a time-consuming and computationally intensive process. The wide variety of possible shapes for the seals, for example in terms of their cross section, further raises the complexity of the monitoring camera test algorithms to be processed by the evaluation electronics.

In order to meet the enhanced quality requirements placed on the seal fitting, but also to increase sealing station productivity, it is proving increasingly necessary to shift the monitoring of accommodation position to the process of seal accommodation, at least to the critical phases thereof, and to perform the latter within narrow time intervals, that is, to process ever increasing quantities of test data. The software required for this purpose greatly drives up the price in optical monitoring processes.

However, the time requirements that a high processing clock places on monitoring must be satisfied nonetheless. While this condition poses no problem in inertia-free optical methods involving electronic evaluation, the mechanical steps taken to separate out defective seals should also diminish the work cycle to the least possible extent.

In order to correct processing errors during seal fitting once they have been detected, an incorrectly fitted cable had previously been sorted out after the fact and destroyed. This method reduces the productivity of the fitting system relative to the goal of having the correction take place as proximate in time to the error as possible, and still in the same procedural step whenever possible.

SUMMARY

An object of the present invention arises from the above disadvantages associated with the conventional monitoring of seal orientation, and specifically involves providing a simple method and a device for fitting a cable with seals, in which the orientation of seals on the holding arbor may be monitored more cheaply in comparison to prior art. The goal of this simple monitoring routine is to detect seals with a faulty orientation on the holding arbor as soon as possible, so that the process of separating out a faulty seal may take place already before the seal is assembled on the cable.

This object may be achieved according to the invention using a mechanical-electrical method and a device for implementing such method.

The method according to the invention encompasses two procedural components: One of these procedural components involves measuring the mechanical force and/or mechanical pressure of the holding arbor on the seal along the accommodation path on which the seal is to be accommodated by the holding arbor during a forward stroke of the holding arbor or during the time that elapses in the process (i.e., the force and/or pressure as a function of the path provided for accommodation or time required to traverse said path), followed by the processing of measured data.

The measurements or recordings are here evaluated fast enough that, given a negative test result, a seal deemed to be unusable may be separated out, and the holding arbor may be reversed in a timely manner as additionally required in this case.

The force at which the holding arbor is punched into the seal is a process-inherent force, so that the force or pressure measurement according to the invention and its evaluation accompany the process.

One essential component of the evaluation involves the comparison of force-path value pairs or pressure-path value pairs or force-time value pairs or pressure-time value pairs to reference value pairs, or of variables derived from the measured value pairs to corresponding reference variables. According to the invention, this comparison is the criterion for deciding on whether to further process a tested seal.

The above measurements are performed in various configurations of the invention using piezoelectric or capacitive sensors, but also strain gauges. A combination of these sensor types is also conceivable.

The second procedural component encompasses the potential elimination of seals deemed to be fault-prone. If necessary, this procedural step takes place by removing seals to be categorized as scrap from the holding arbor during the reverse stroke of the holding arbor and/or disposing them via a disposal system (e.g., by means of a discharge nozzle or drop shaft) after this reverse stroke has progressed sufficiently, wherein the holding arbor is reversed for as seamless a transition as possible to the next seal accommodation, as already mentioned.

Therefore, the procedural steps may be briefly summarized as follows:

According to the invention, the seal is "picked up" once it has been transported to the accommodation position by the conveyor and pre-oriented in the accommodation position. The force expended and/or pressure expended is here measured, recorded and further processed. The seal has a specific orientation in the accommodation position. If this orientation coincides with the primary axis of the holding arbor and the seal is in the envisaged accommodation position prior to its accommodation, the position and orientation of the seal on the holding arbor are hence correct, that is, the direction of its central tunnel/bore runs coaxially to the primary axis of the holding arbor. The force and/or pressure-path measuring unit then reports an uncritical force and/or pressure-path progression. Otherwise, that is, given a faulty orientation of the seal on the holding arbor, the force and/or pressure-path progressions exit the tolerance range, and the seal is separated out. The same set of circumstances applies with respect to the measured force and/or pressure-time progressions.

A device according to the invention disclosed for implementing the method according to the invention is the transfer unit expanded in relation to prior art to include a force and/or pressure-measuring device. In a configuration reflecting prior art, this transfer unit is a machine unit of the seal station, which is designed to execute both an up and down motion as well as a swiveling motion. Consequently, it encompasses two separate pneumatic cylinders, specifically a lifting and positioning cylinder, along with the holding arbor as the most important component.

The transfer unit is provided for the automatic process of accommodating a seal via the conveyor until the seal is slipped onto an assembly pipe, a process referred to as a transfer process, a possible embodiment variant of which will be described below. The assembly pipe rests on a multipart arrangement of horizontally traversable carriages (preferably an upper and lower carriage). In order to provide a complete, overall illustration of function, we will now elaborate a bit further, and briefly describe below the remaining functions of the holding arbor as a constituent of the transfer unit within the framework of the transfer process.

After a seal has been accommodated by the holding arbor, the transfer unit is swiveled by the positioning cylinder in such a way that the holding arbor assumes a position in front of a pinhole diaphragm and coaxial to its hole axis. This pinhole diaphragm consists of a preferably two-part wall made out of plastic, wherein the holding arbor is pushed through the hole therein during the ensuing forward stroke powered by the lifting cylinder. However, since the seal resting on the holding arbor strikes the diaphragm in the process, this forward stroke on the holding arbor pushes backward. As the forward stroke of the holding arbor continues, a pipe coaxially enveloping the arbor in its rear section thereafter opens the pinhole diaphragm so wide that the seal resting on the holding arbor now can also pass through the diaphragm. Finally, the holding arbor is introduced into the aforementioned assembly pipe positioned coaxially opposite, thereby slipping the seal onto this assembly pipe. Later in the processing sequence, the assembly pipe is directly engaged in the fitting of the cable with the seal, and hence comprises part of the actual seal fitting device.

The holding arbor consists of two or more parts in two disclosed embodiment variants according to the invention, and exhibits force and/or pressure measuring devices in proximity to the interfaces of its adjacent individual parts, which transmit their measuring signals from the conveyor or immediately thereafter to evaluation electronics in the process of accommodating the seal.

According to the invention, however, viewed in the direction of the forward stroke of the holding arbor, these force and/or pressure measuring devices may also be located behind the holding arbor in or parallel to the action line of the accommodation force and non-positively relative to parts of the holding arbor when using a one- or multipart arbor.

The evaluation electronics are used to evaluate the recorded force and/or pressure gradients, so as to decide whether or not to further process the tested seal, if necessary in tandem with a higher-level controller in order to reverse the holding arbor if the tested seal is separated out.

Some of the numerous advantages to the method according to the invention and device according to the invention for implementing this method will now be explained below.

It is especially advantageous to metrologically acquire entire progressions or partial progressions of measured variables, specifically the force-path or pressure-path progressions or the force-time or pressure-time progressions. This makes it possible to derive more informative comparative variables from the mentioned quantity of value pairs for deciding whether to continue processing a currently tested seal. In this sense, for example, the integral for the overall or partial progression of accommodation force to be expended by the holding arbor along the accommodation path can be used as a practical criterion for deciding whether a seal is correctly oriented on the holding arbor. This integral represents a scalar measure for the mechanical work to be performed by the holding arbor for the overall accommodation process or a partial accommodation process.

This integral varies as a function of how the seal is acquired by the holding arbor during its forward stroke, and as a function of the material properties of the seal. The required case differentiation plus numerical integration is easily mastered by means of modern evaluation electronics.

One possible approach toward ordering the magnitude of work expended by the holding arbor for a common seal material is geared toward the error scenarios mentioned above during the accommodation of the seal via the conveyor:

If the holding arbor advances into an empty space during its forward stroke because no seal is present in the accommodation position, the work to be performed by the holding arbor will naturally be at the lowest level.

The next highest level of work expended arises if the seal correctly punches centrally through the holding arbor. In this case, the holding arbor must essentially perform the corresponding work needed to overcome the frictional force component in the direction opposite the forward stroke of the holding arbor. As in itself known, this frictional force, which undergoes a slight, progressive rise corresponding to the conicity of at least portions of the holding arbor, must be surmounted to establish the preconditions for widening the seal in the next procedural step, which specifically involves slipping the seal onto the assembly pipe by introducing the holding arbor into this assembly pipe.

On the presumption of often used seal materials, even more mechanical work must be expended by the holding arbor if the holding arbor punches through the jacket of the seal from outside or inside.

Finally, the holding arbor must expend the most amount of work if the seal is only crimped, that is, if it resists penetration by the holding arbor due to a correspondingly higher resilience of its material, and then becomes jammed in the accommodation area by the holding arbor.

Comprehensive test series based on this simple qualitative model have resulted in reference progressions, which can be used as a standard of comparison to arrive at an unambiguous decision for different cases of acquiring the seal by the holding arbor and various seal materials and seal forms as to whether the seal acquired by the holding arbor can be further processed or must be separated out. Suitable evaluation algorithms for this purpose may be smoothly executed by a computer, in particular a fast microcontroller, at least at a rate fast enough to separate out a seal deemed to be unusable and reverse the holding arbor as required in this instance given a negative test result, in a timely fashion.

Another advantage to the method according to the invention is that separating out defectively oriented seals delays the fitting process as little as possible, as will be described below.

Let us first examine a case in which, given a faulty accommodation or none at all, the holding arbor maximally penetrates into the seal to a point where the seal does not yet get caught on the holding arbor. As already mentioned, this case is present when, for example, the seal is only crimped by the holding arbor, possibly damaged on the inside and/or outside, and remains in the accommodation area (case 1a). If the force-path measurement or pressure-path measurement or corresponding force-time measurement or pressure-time measurement detects a faulty orientation of this kind, the holding arbor, which initially executes a reverse stroke given a flawless seal accommodation, so as to remove the accommodated and widened seal onto the accommodation pipe at the end of the next forward stroke by penetrating into the accommodation pipe, is reversed according to the invention in such a way that its reverse stroke is followed by a forward stroke for accommodating the next seal. By using the time of the reverse stroke of the holding arbor according to the invention to remove the only-crimped seal remaining in the accommodation area from the accommodation area by means of a disposal device, for example a compressed air nozzle or drop shaft, the delay of the fitting process caused by separating out this seal is confined to the narrowest possible limits.

In another important error that has also already been mentioned, the seal is faultily accommodated because the holding arbor fails to move parallel to the central tunnel axis of the seal, and the jacket body of the seal is punched through from the inside out. According to the invention, a stripping device initially intervenes during the reverse stroke of the holding arbor, stripping the faultily accommodated seal from the holding arbor. As the reverse stroke continues, the punctured seal is removed from the accommodation area as before by means of a disposal device, and the correspondingly reversed holding arbor starts its ensuing forward stroke to accommodate the next seal that had been pushed forward.

Another important advantage has to do with the fact that the force and/or pressure measurement is invariant as to form. When using a digital camera, optically detecting a failed pre-orientation of a seal requires that the position of the photographed seal be analyzed relative to its environment on the one hand, and that the form of the photographed seal be taken into account on the other. Seals are today being used in a plurality of different configurations for a wide variety of purposes. The mechanical-electrical test eliminates the need for the aforementioned outlay associated with the use of a digital camera, since the decision as to whether to further process the seal after the accommodation motion of the holding arbor can only be made based on the force-path or pressure-path progressions or the force-time or pressure-time progressions, that is, regardless of the angle assumed, for example, by the tunnel axis of the acquired seal relative to the primary axis of the holding arbor, or whether the cross section of the seal is circular or rectangular, for example.

As opposed to the (in particular optical) methods known in the art, which only check the seal externally and not as a whole, the method according to the example makes it possible to detect internal damages (i.e., damage to the inner sealing lips, for example) to a seal.

In addition, in particular piezoelectric force or pressure measurements are much more robust than optical test methods.

Finally, the clearly lower price of the mechanical-electrical test method according to the invention by comparison to conventional optical test methods is advantageous, since it lowers the price of the entire seal station.

An advantage to the transfer unit according to the invention lies first and foremost in the fact that this transfer unit enhances the safety of the fitted seals. The transfer unit according to the invention automatically prevents damaged seals from being slipped onto cable ends and producing scrap cable in this way, because seals to be classified as scrap goods are already separated out after the forward stroke of the holding arbor for accommodating the seal has completely run its course. While prior art must rely upon a costly optical device (usually a digital camera) to check the orientation of the seal, the mechanical-electrical monitoring device according to the invention robustly and cost-effectively yields a decision as to whether a checked seal will be further processed or not.

As already mentioned, as an alternative to the described force-path and/or pressure-path or force-time and/or pressure-time measurement, the invention also makes it possible to arrange the used force transducer outside of the holding arbor, specifically behind the holding arbor in or parallel to the action line of the accommodation force and non-positively relative to parts of the holding arbor, as viewed in the direction of the forward stroke of the holding arbor. This alternative test setup brings with it some additional advantages in terms of handling the transfer device and saving on costs:

All holding arbors of a conventional arbor set may be retrofitted with just a single external sensor to make them capable of measuring force or pressure.

No connection lines have to be hooked up while changing the holding arbors, since they remain connected permanently.

The sensor can be better protected when built in.

BRIEF DESCRIPTION OF THE DRAWING

The method according to the invention and the device according to the invention for its implementation will now be described based on several exemplary embodiments (FIGS. 1-8).

Shown in:

FIGS. 1A to 1K is the basic sequence followed during the assembly of a seal or cable tunnel.

DETAILED DESCRIPTION

Figure 1E:
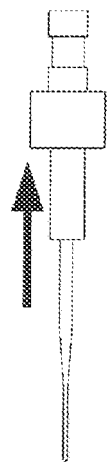
Figure 1E:
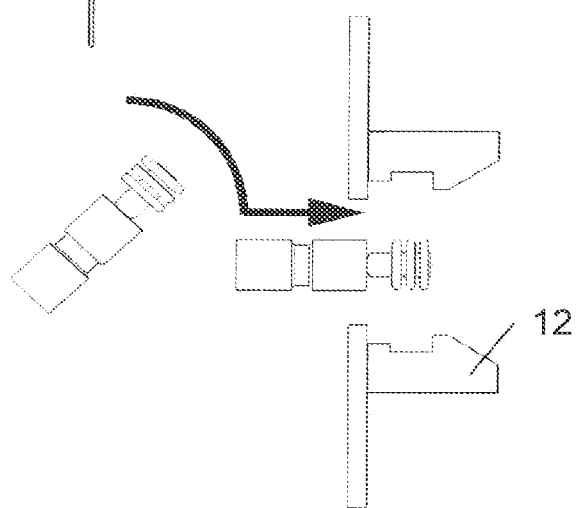
Figure 1F:
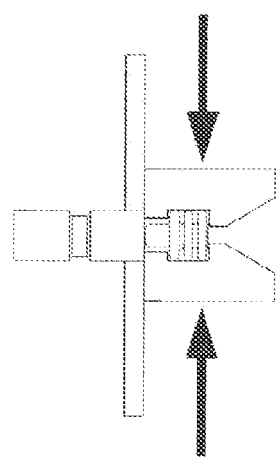
Figure 1G:
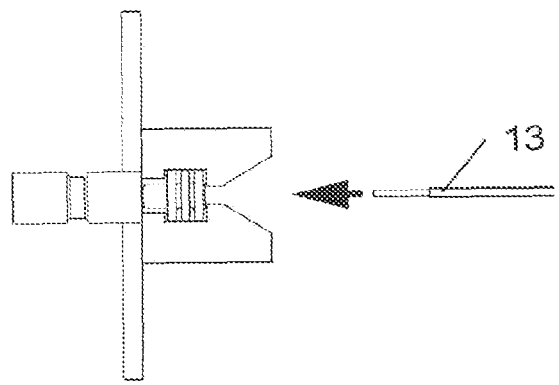
Figure 1H:
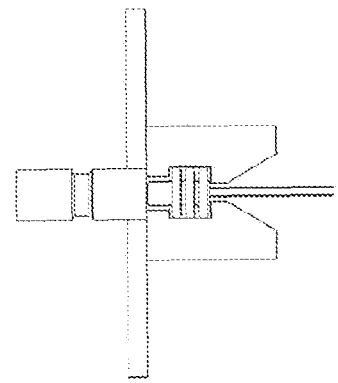
Figure 1I:
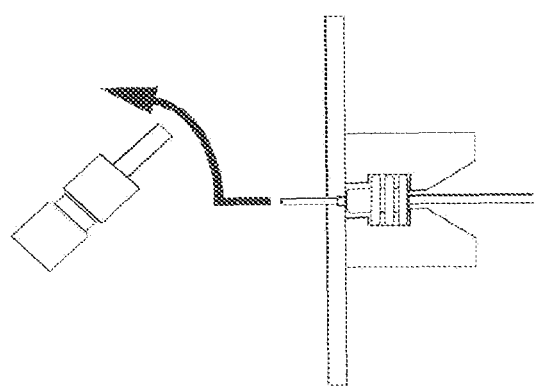

FIG. 1A to 1K show the basic sequence followed during the assembly of a seal 1 or cable tunnel (see also the flowcharts presented on FIGS. 6A to 6C and 7A to 7C). In a first section depicted on FIG. 1A, the seal 1 is slipped onto a holding arbor 2. To this end, the holding arbor 2 is moved downward, for example into the area of a feeder rail (not shown), in which the seals 1 are brought in. The holding arbor 2 accommodating the seal 1 then returns to its original position, as shown on FIG. 1B. In another step, the holding arbor 2 is pushed into an assembly pipe 11, and the seal 1 is slipped onto the assembly pipe 11, as depicted on FIGS. 1C and 1D. In a step shown on FIG. 1E, the holding arbor 2 is taken out of the assembly pipe 11, the assembly pipe 11 is swiveled by 90°, and then pushed along with the seal 1 into a seal chamber 12. The seal chamber 12 is then closed as depicted on FIG. 1F. In a step shown on FIG. 1G, a cable or wire 13 is pushed into the assembly pipe 11 (see also FIG. 1H). As depicted, this cable or wire may have a stripped end. In another step depicted on FIG. 1I, the assembly pipe 11 is pulled out of the seal chamber 12, leaving the seal 1 behind on the wire/cable 13 in the seal chamber 12. In a step shown on FIG. 1J, the seal chamber 12 is opened, after which the wire/cable 13 with the seal 1 is taken out of the latter, as depicted on FIG. 1K.

Of course, the course of action shown is only intended to provide an exemplary illustration for the assembly of a seal 1 on a wire/cable 13. The invention is by no means limited thereto, with the ordinarily skilled reader instead deriving a plurality of possible applications for the presented instruction from the latter.

Figure 2:
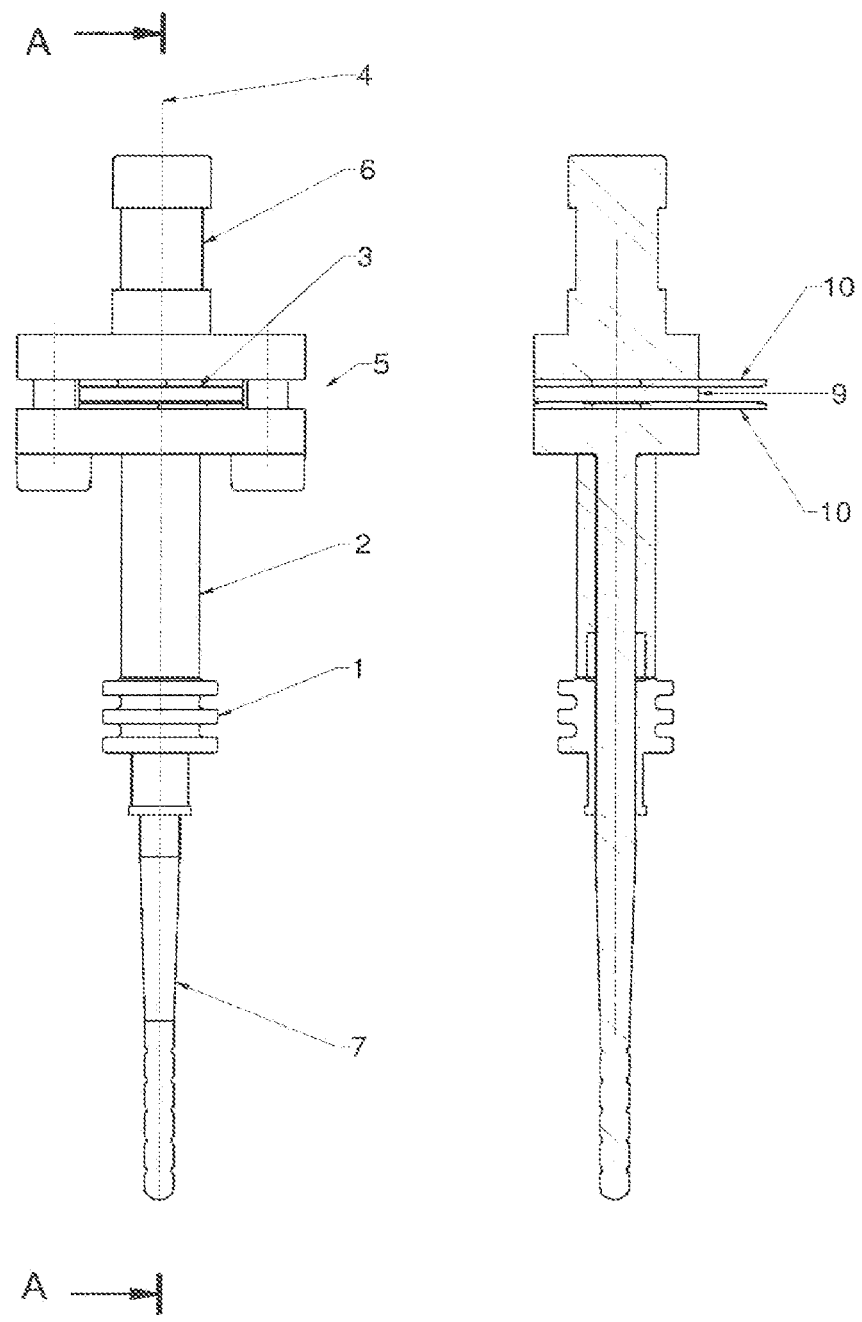
FIG. 2 is a first exemplary embodiment of the holding arbor according to the invention in a schematic sectional view A-A with the seal correctly oriented on the holding arbor.

FIG. 2 presents a first exemplary embodiment of a two-part holding arbor 2 according to the invention with a seal 1 correctly oriented on the holding arbor 2 and a perpendicularly aligned primary axis 4, in a side view to the left, and a sectional view to the right.

In the arrangement depicted, a force and/or pressure transducer 3 is situated between two crimping jaws, and is pre-tensioned by two screws with counter nuts secured to the crimping jaws. The two lateral expansions of the lower part 7 and upper part 6 of the holding arbor 2 lying opposite as well as the force and/or pressure transducer 3 comprise the interface 5 between the parts 6, 7 of the holding arbor 2 used to relay the force to be acquired. The electrical contacts on either side of the sensor element 9 are routed to the outside as flat conductors 10 adhesively bonded to a suitable insulating carrier material, preferably paper or a film.

Figure 3:
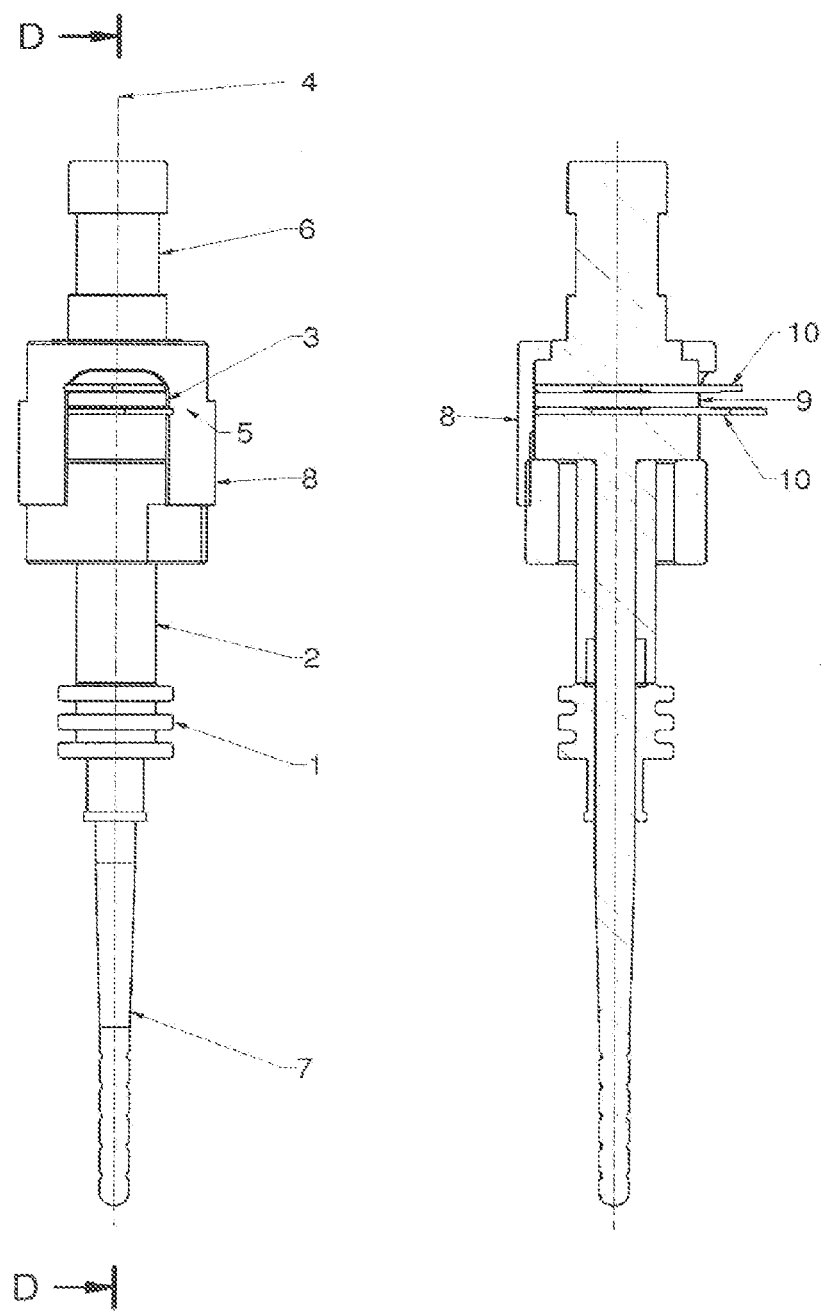
FIG. 3 is a sectional view D-D of another exemplary embodiment according to the invention for the holding arbor.
Figure 4:
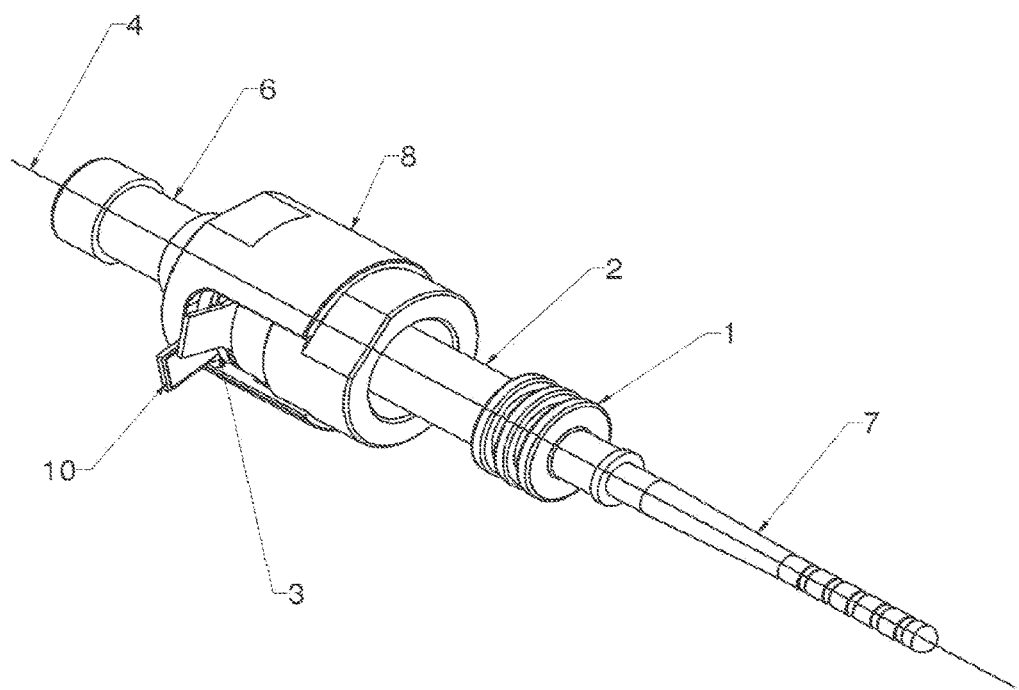
FIG. 4 is an inclined view of the holding arbor according to the invention per FIG. 3.
Figure 5A:
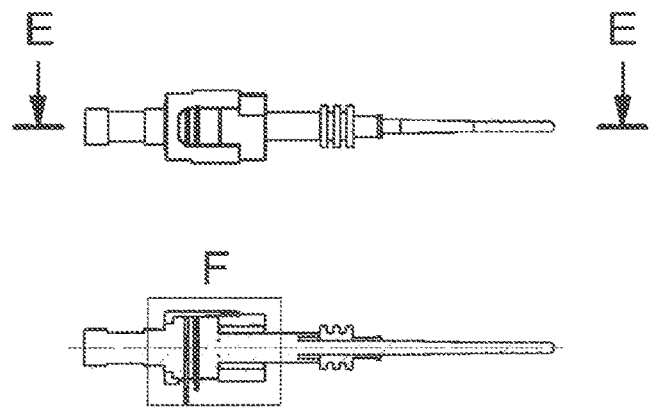
FIG. 5A is a sectional view E-E depicting a section F of a holding arbor according to FIG. 3, representing an interface at the boundary between two parts of this holding arbor.

FIG. 3 illustrates another exemplary embodiment of the holding arbor 2, which is distinguished from FIG. 2 in that a two-part bushing 8 partially encapsulates the sensor. The bushing 8 is provided to better protect the force transducer 3, and simultaneously assumes the function of pre-tensioning the force and/or pressure transducer 3. FIG. 4 provides a particularly clear view of the details of the holding arbor 2 presented on FIG. 3, while FIG. 5B magnifies those of the interface 5 by showing a section F, which is defined in the total view FIG. 5A of the holding arbor 2.

Figure 5B:
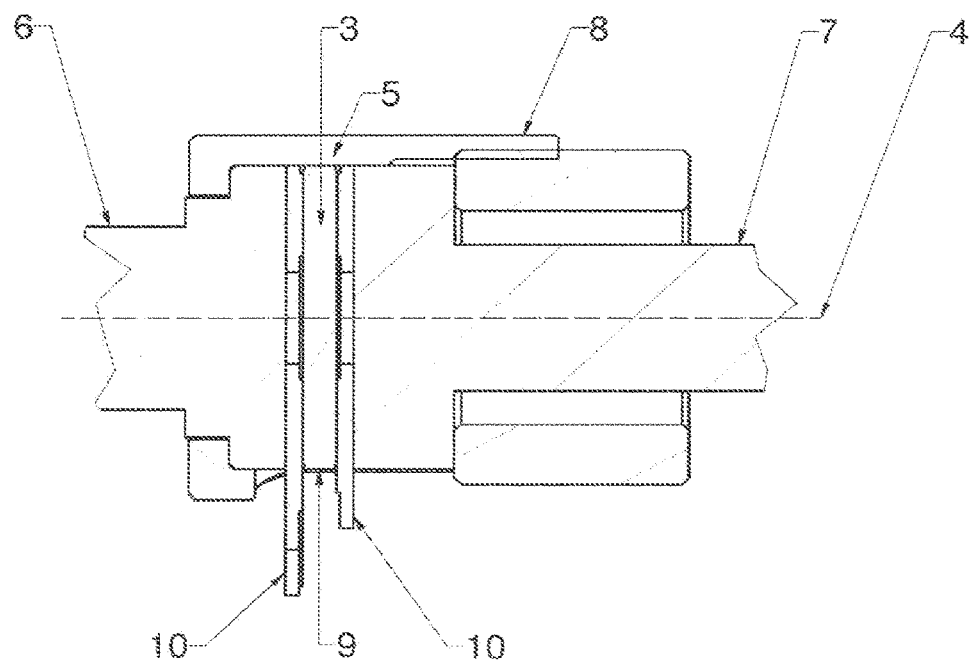
FIG. 5B is a more detailed view of the section F shown in FIG. 5A, FIGS. 6A . . . 6C depict an exemplary flowchart for the assembly of a seal according to prior art, FIGS. 7A . . . 7C depict an exemplary flowchart for the assembly of a seal according to the invention.

FIG. 4 gives an inclined view of the overall holding arbor 2 according to FIG. 3, while FIG. 5B shows a sectional view of its partially encapsulated measuring cell. As already mentioned, the two adjacent arbor parts 6, 7 situated coaxially relative to the shared primary axis 4 are laterally expanded at their opposing ends, and non-positively accommodate a force and/or pressure transducer 3 in between. The interface 5 in the holding arbor 2 comprised of the aforesaid end parts of the arbor and the force and/or pressure transducer 3 is held in place by a two-part bushing 8 that can be screwed into itself. This bushing 8 may be used to mechanically pre-tension the force and/or pressure transducer 3 by screwing together the two bushing parts, with the effect of reducing the length of the entire bushing 8. The arbor part 7 on the accommodation side is spaced laterally apart from the part of the bushing 8 on the accommodation side so as to prevent the holding arbor 2 from becoming laterally jammed.

The force and/or pressure transducer 3 is preferably designed as a piezoelectric sensor, but may also be a capacitive sensor. In both cases, the sensor element 9 configured as a piezo disk or in the form of a plate capacitor is contacted on both sides by flat conductors 10 as in the exemplary embodiment according to FIG. 2, which are adhesively bonded in the same way to a suitable insulating carrier material, preferably paper or a film.

Finally, the force and/or pressure measurements may also make use of strain gauges, which may be calibrated. In this case, however, the pressure transducer 3 may be embodied as a measuring box or load cell having strain gauges, or the structural design of the measuring cell can alternatively be adapted as required relative to the one on FIGS. 2 to 5B in another way.

Figure 6A:
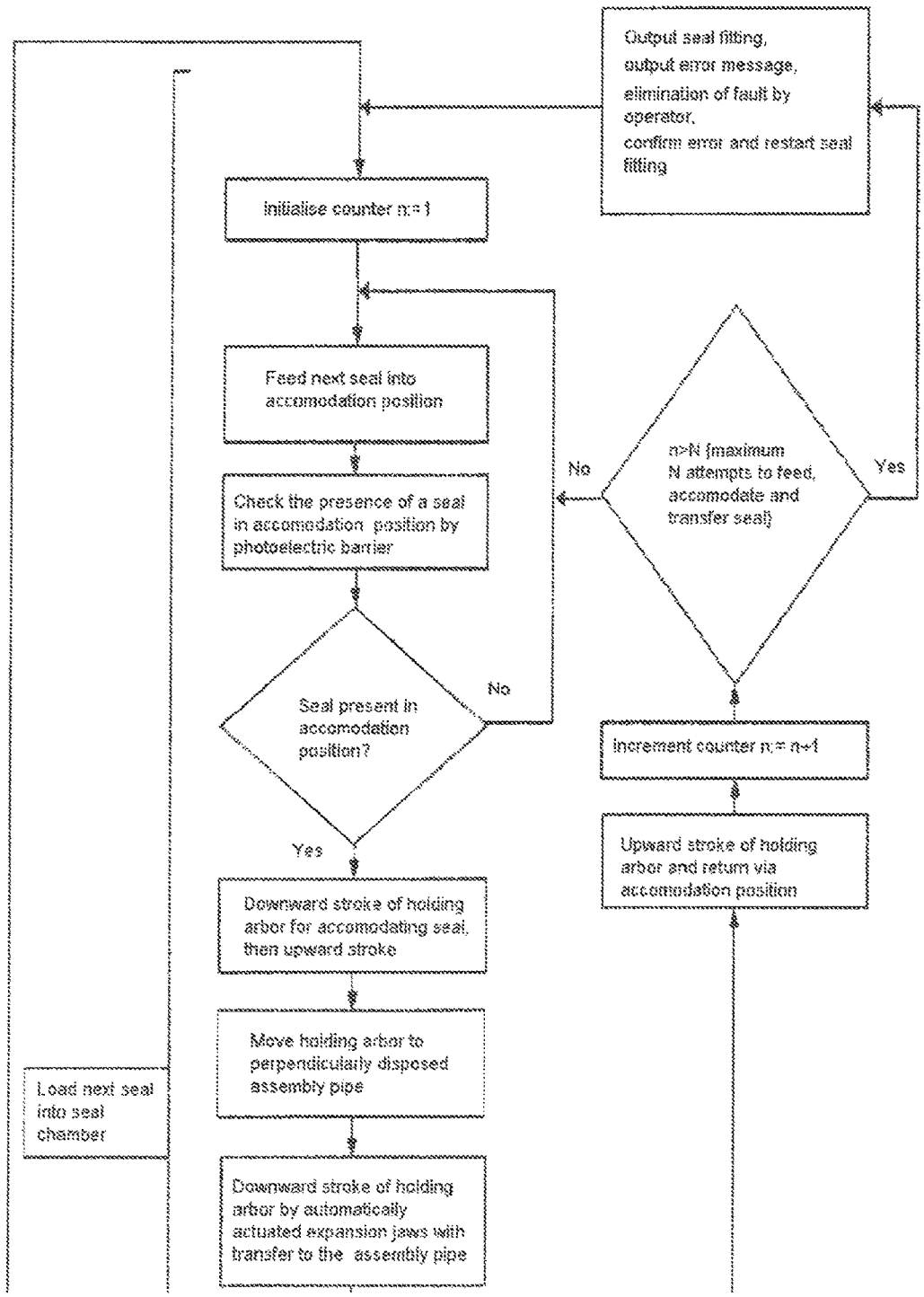
Figure 6B:
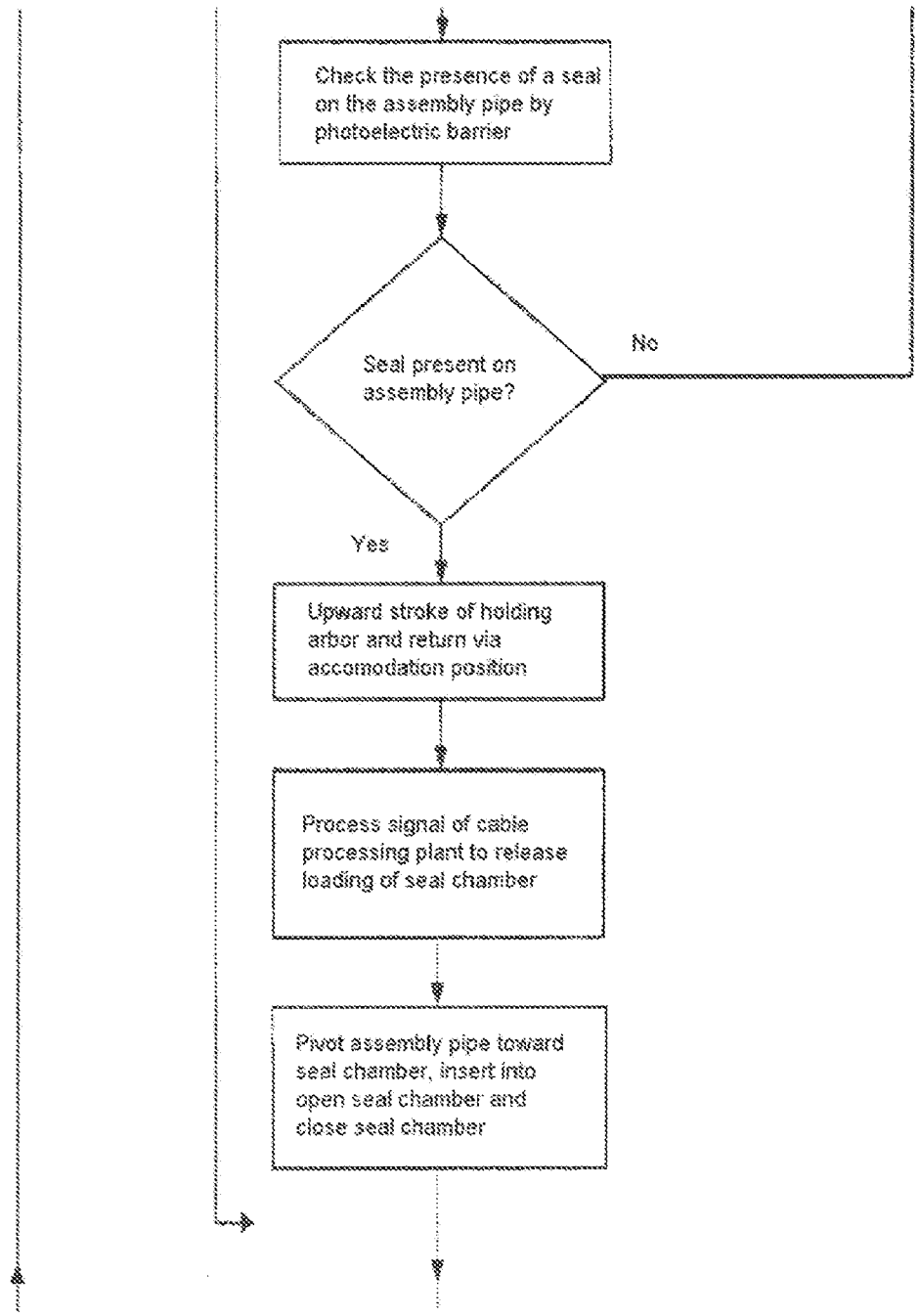
Figure 6C:
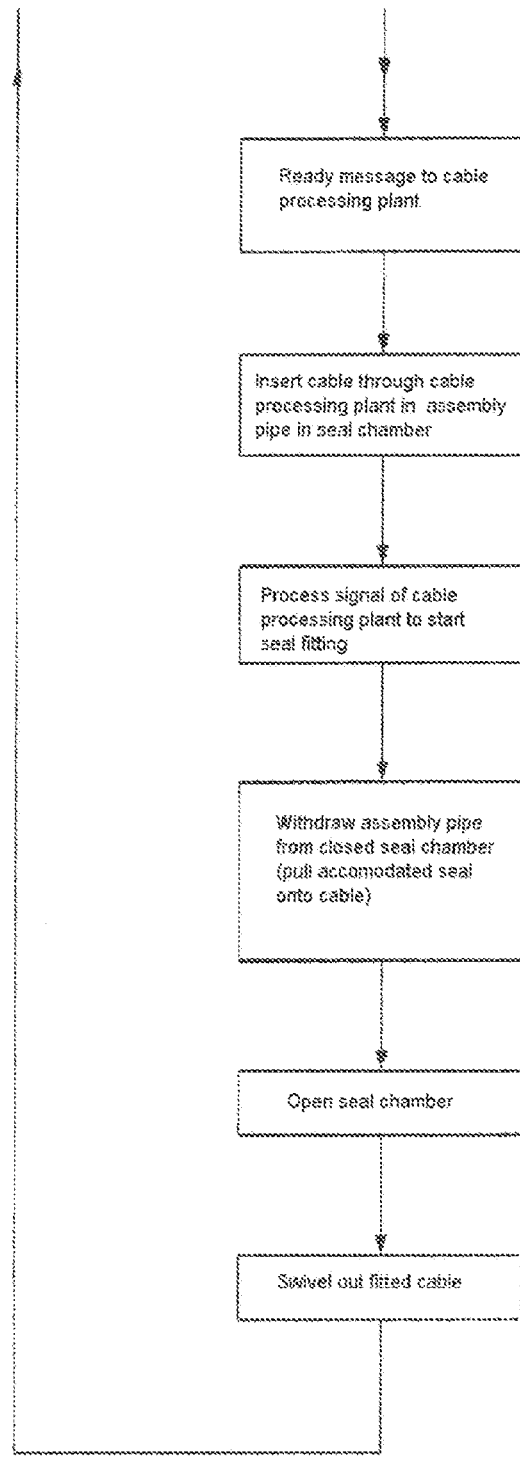

FIGS. 6A to 6C show a flowchart according to prior art, which depict the method presented on FIG. 1A to 1K. As may readily be gleaned from the chart, a check is basically performed to determine whether a seal 2 is present on the holding arbor 1 or assembly pipe 11, but no test is run to determine whether the latter is undamaged too. Therefore, it cannot be precluded that an unusable cable arrangement will be produced.

Figure 7A:
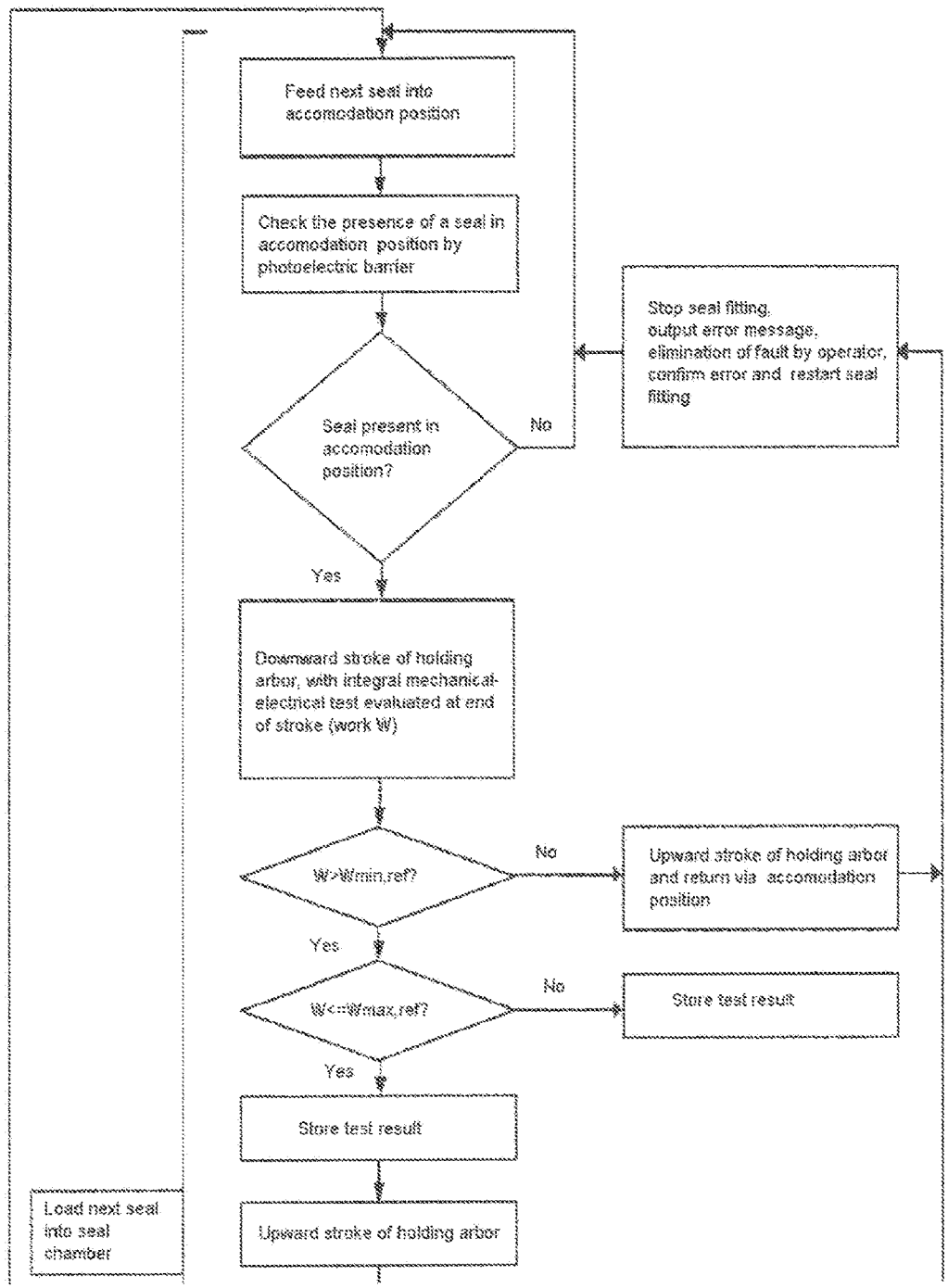
Figure 7B:
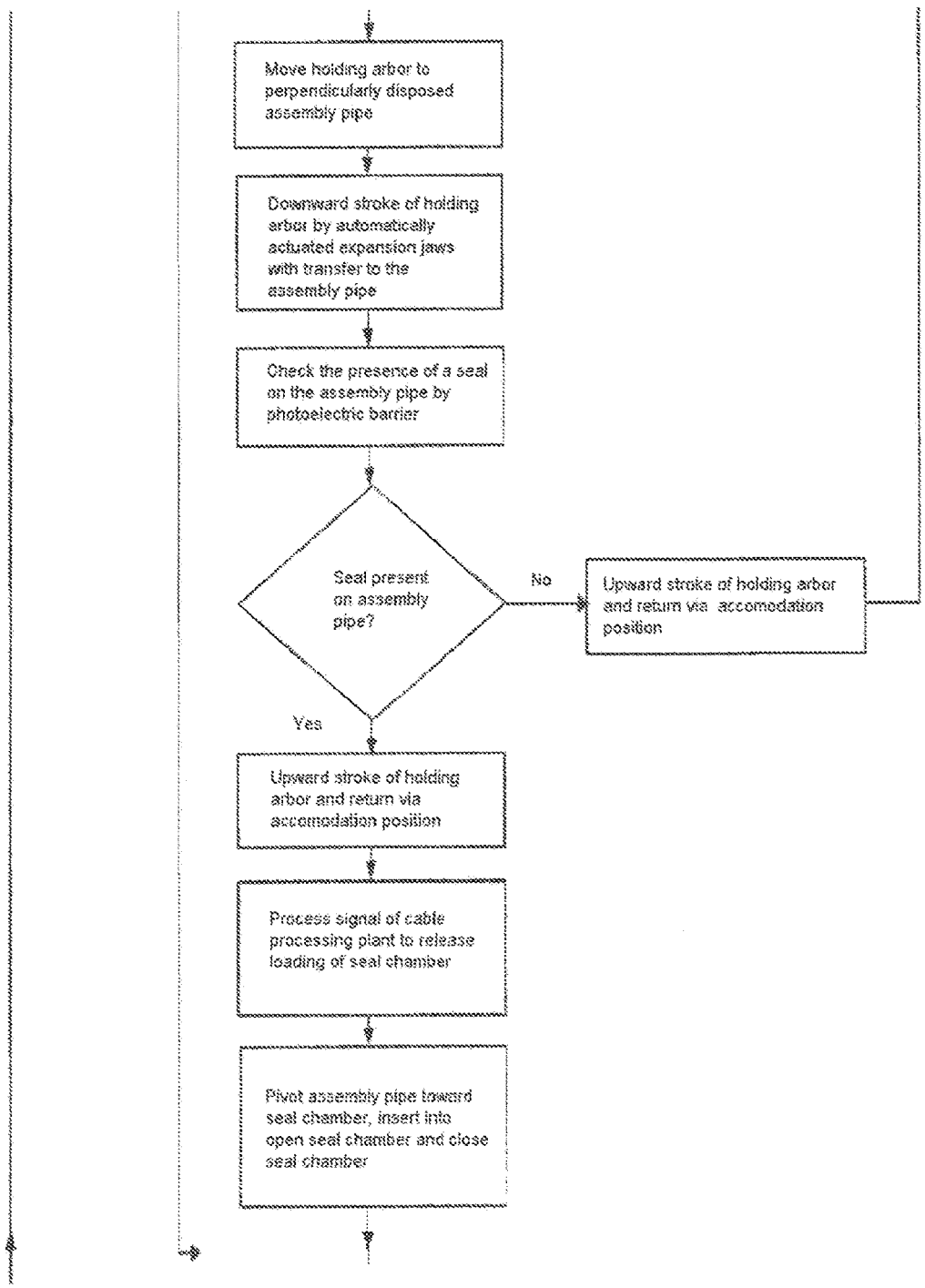
Figure 7C:
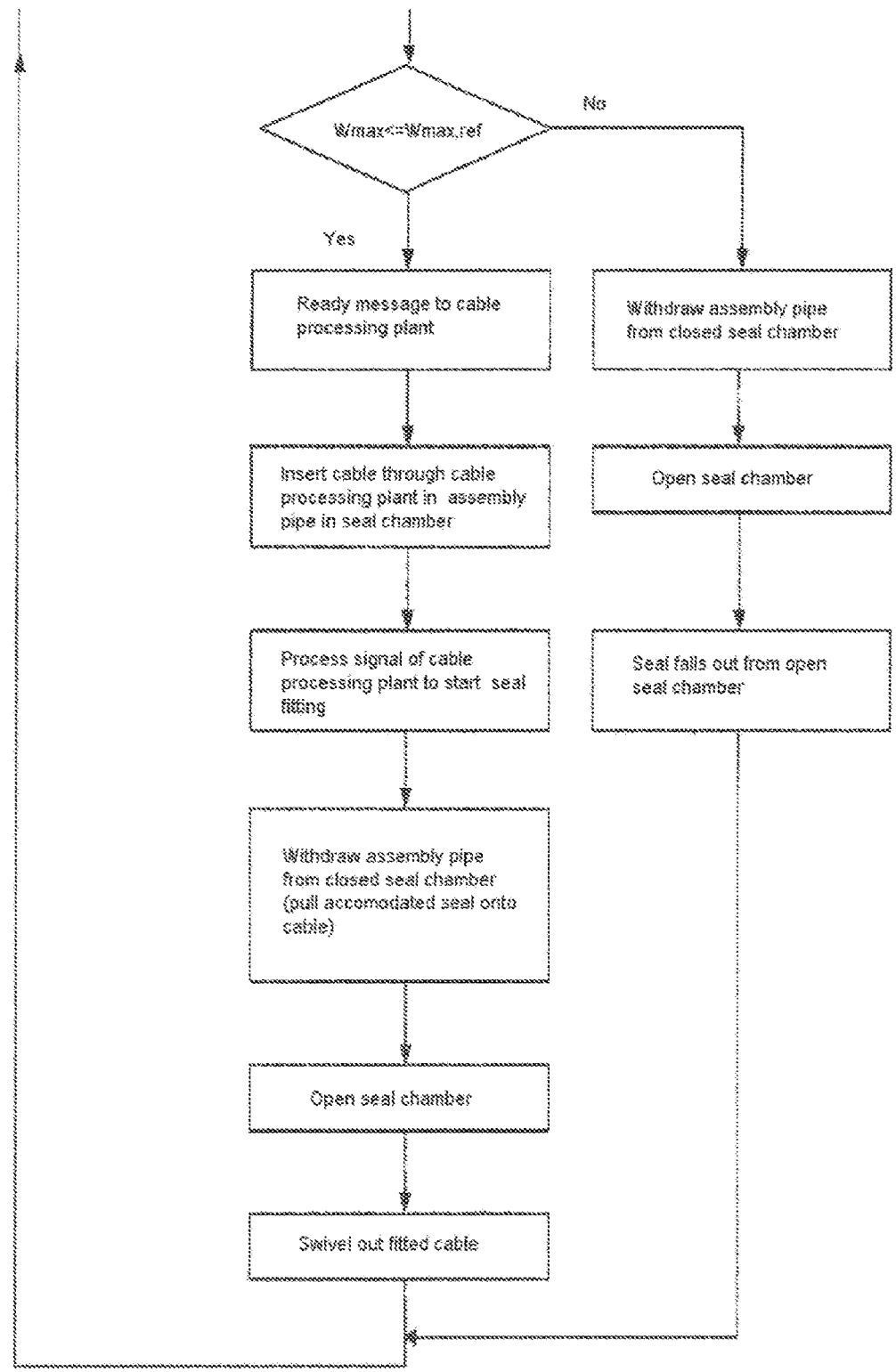

FIGS. 7A to 7C depict an improved method in relation to prior art, since the inquiries W<=Wmax,ref? (see also FIG. 8B) ensure that only those seals 1 are mounted on the wire/cable 13 that were not damaged by the holding arbor 1. The inquiry W>Wmin,ref? (see also FIG. 8B) can also be used to check whether a seal 1 was even slipped onto the holding arbor 2 at all.

Figure 8A:
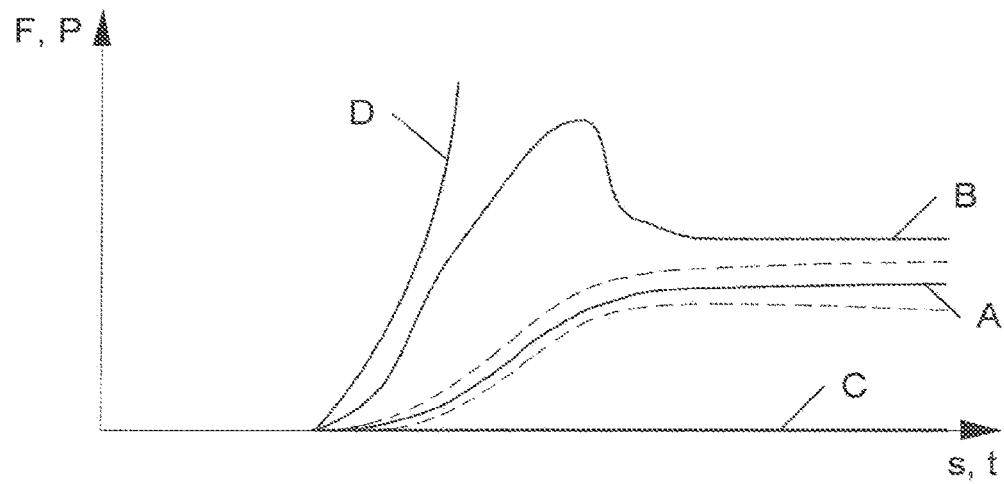
FIG. 8A shows exemplary force-path progressions during the accommodation of a seal via the holding arbor.

FIG. 8A now presents exemplary force-path progressions F over s given the proper accommodation of a seal 1 (curve A), given the destruction of the seal 1 (curve B), given a missing seal 1 (curve C) and given a seal 1 that is only crimped by the holding arbor 2 (curve D). The path s here relates to the path traversed by the seal 1 on the holding arbor 2. This need not be a continuous motion, as the seal 1 can also be slipped onto the holding arbor 2 in several steps as well. For example, FIG. 8A presents exemplary force-path progressions for the procedural steps shown on FIG. 1A to 1C.

As may readily be gleaned from FIG. 8A, no force F is measured at first as the holding arbor 2 moves. Only once the latter encounters a resistance a force F can be detected. This force increases slightly for curve A when the seal 1 is being slipped over the conical portion of the holding arbor 2, and then remains more or less constant while the seal 1 is being slipped over the cylindrical portion of the holding arbor 2.

A strong rise in force F may come about if the seal 1 is incorrectly accommodated, which abruptly drops again at a certain point in time, specifically when the holding arbor 2 punches through the wall of the seal 1, thereby destroying it. After punching through, the force F stays more or less constant, but at a higher level than for curve A, since the seal 1 the case of curve B is not slipped over the holding arbor 2 by way of a prefabricated hole, but rather via a hole created by the latter.

If no seal 1 is accommodated at all, the force remains at a very low level as indicated by curve C, or even measures zero, since the holding arbor 2 advances into an empty space.

If the seal 1 is only crimped by the holding arbor 2, the force increases very sharply given just a slight displacement path (or path of penetration by the holding arbor 2 into the seal 1 in this case), as represented by curve D. In order to prevent damage to the holding arbor 2, the latter may be stopped or moved back.

The different characteristics for curves A to D may now be used to detect the correct sequence for assembling a seal 1 on a cable or wire 13. For example, a corridor or range (see dashed lines in FIG. 8A) may be provided within which the curve A is allowed to run. If the actually ascertained force progression is above this corridor, a seal 1 was in all likelihood punched through or crimped, while if it lies below, no seal 1 was in all likelihood accommodated at all.

Of course, other methods are here also conceivable for qualifying an assembly process, for example adaptive algorithms may be applied, e.g., so that drift by the force/pressure transducer 3 or manufacturing tolerances of the seal 1 may be offset. For example the corridor or range shown in FIG. 8A may be arranged symmetrically around a mean curve (nominal curve) of a set of curves A. If said nominal curve drifts because of e.g. sensor drift, then said corridor or range is shifted too, Otherwise crimps with good quality could mistakenly be qualified as bad. In addition to the depicted force-path characteristic (F over s), it is just as possible to use a force-time characteristic (F over t) or also a pressure-path characteristic (P over s) or pressure-time (P over t) characteristic for qualifying the assembly process.

Figure 8B:
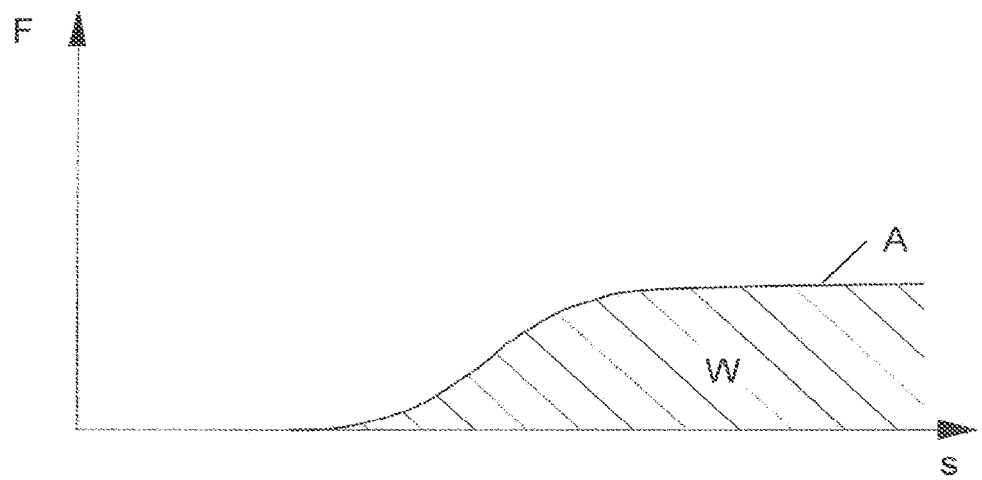
FIG. 8B shows an exemplary force-path progression during the accommodation of a seal via the holding arbor and the work needed therefore.

Moreover, it is possible to use the work (i.e. the integral of the force F over s) needed for the crimping process to qualify the assembly process. FIG. 8B shows the exemplary curve A of FIG. 8A and the work W, which is needed to perform crimping. The actual value for the work W can be compared with a desired value of the same for qualifying the crimping process. Similar to the corridor shown in FIG. 8A an upper threshold value and a lower threshold value may be defined, between which the actual value shall be. In FIG. 8B just the force-path characteristic (F over s) is used to show the work W needed for crimping for the reason of simplicity. However, work W may also defined by other characteristics, like by pressure-path characteristic (P over s).

Figure 9:
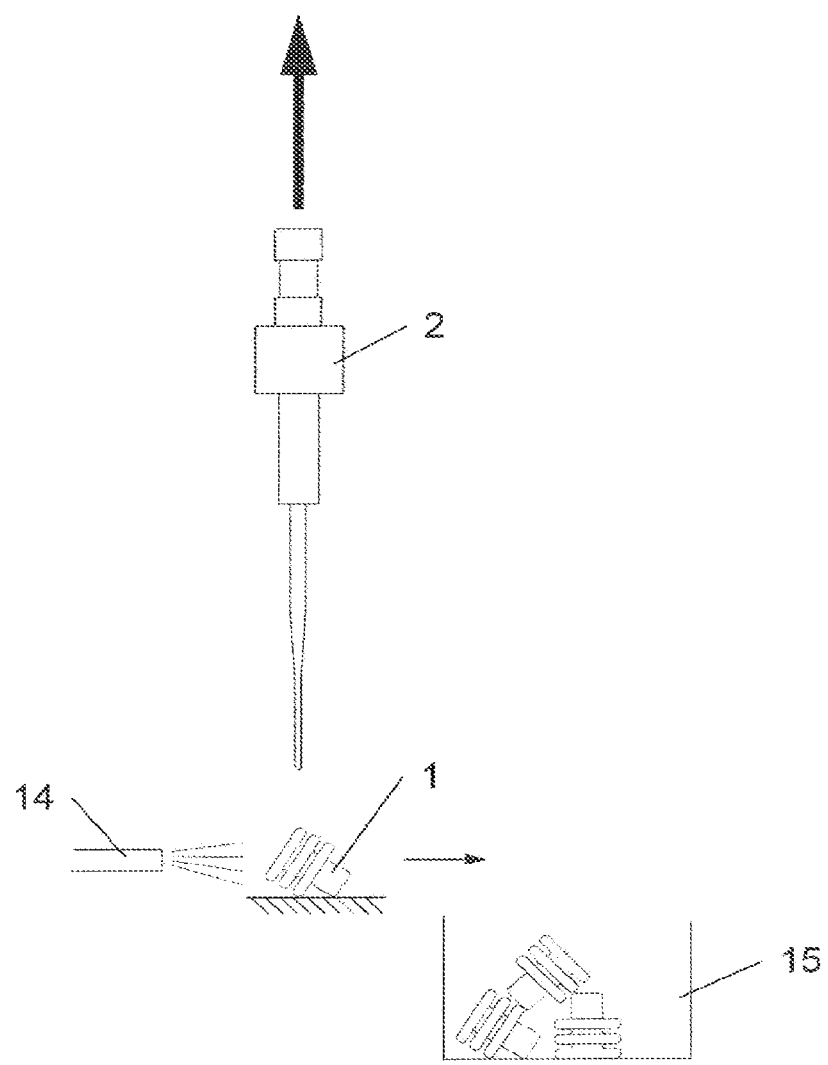
FIG. 9 shows a seal, which is badly oriented on the conveyor/feeder and blown into a waste container by means of compressed air.
Figure 10:
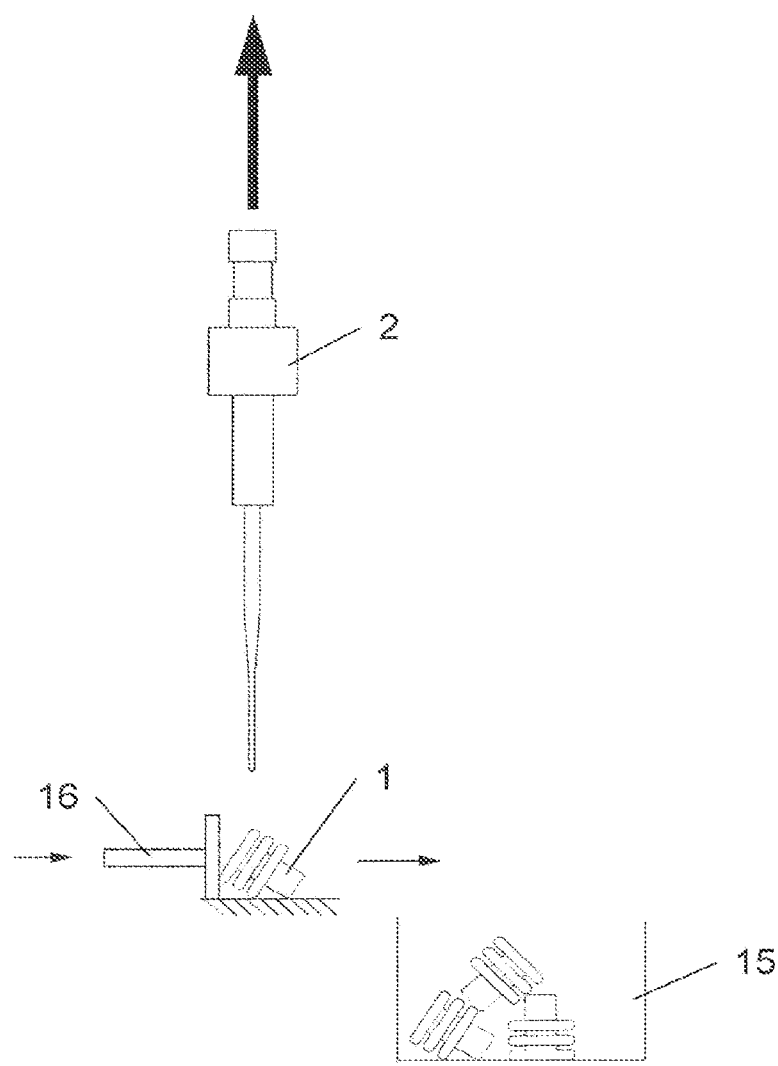
FIG. 10 shows a seal, which is badly oriented on the conveyor/feeder and moved into a waste container by means of a slider.
Figures 11, 12:
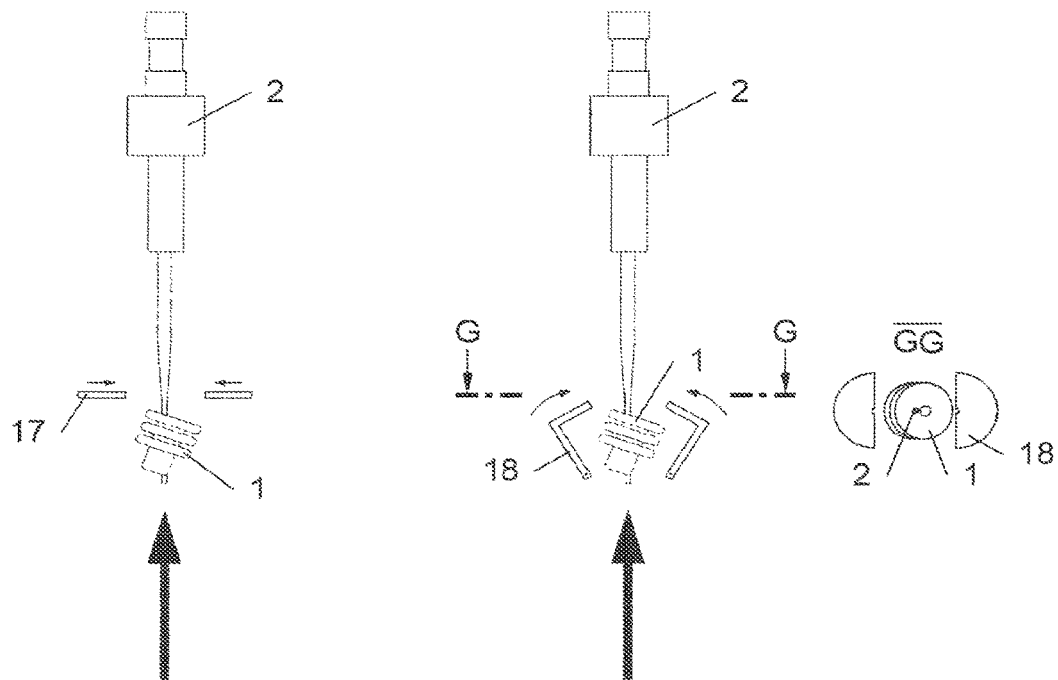
FIG. 11 shows a seal, which is badly oriented on the holding arbor and stripped from the same into a waste container by means of shiftable stripper.
FIG. 12 shows a seal, which is badly oriented on the holding arbor and stripped from the same into a waste container by means of pivotable stripper.
Figure 13:
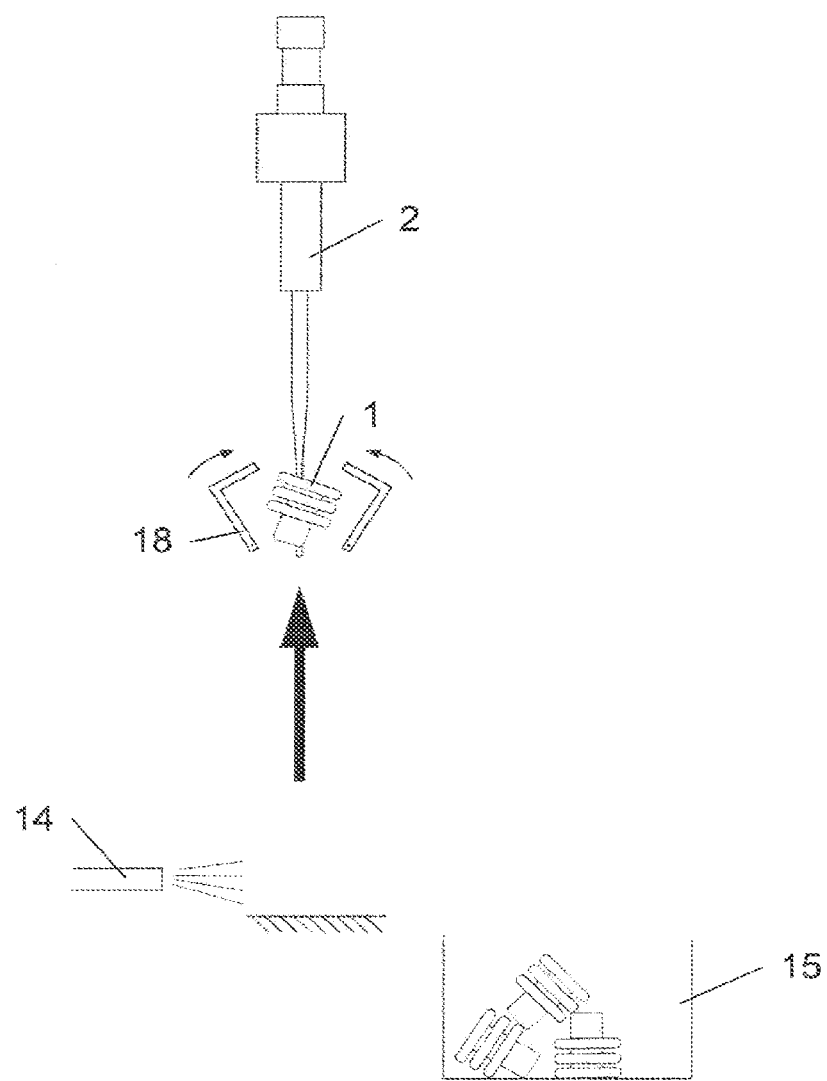
FIG. 13 shows a seal, which is badly oriented on the holding arbor and stripped from the same onto the conveyor/feeder by means of pivotable stripper and then blown into a waste container by means of compressed air, and, FIG. 14 shows a pinhole diaphragm, a conveyor and evaluation electronics for the inventive device.

If it is determined that a seal 1 has been slipped on incorrectly, the production sequence shown on FIG. 1A to 1K or 7A to 7C may be terminated or interrupted at a suitable point. For example, a crimped seal 1 that stayed behind on a feeder can be blown down from the feeder (see FIG. 9) or conveyed into a waste container 15 by means of a slider 16 (see FIG. 10). A seal 1 that was slipped onto the holding arbor 2 but was also damaged can be stripped from the holding arbor 2, for example during the reverse stroke of the holding arbor 2 (FIG. 1B), by means of an inserted stripper 17 (FIG. 11) or inwardly swiveled stripper 18 (FIGS. 12 and 13), which can take the form of a pinhole diaphragm (see section $\overline{GG}$ in FIG. 12, which is equally applicable also to FIG. 13). For example, the holding arbor 2 can be positioned over a waste container 15 to this end (FIGS. 11 and 12). However, it is also conceivable for the seal 1 to be stripped on the feeder, and blown or pushed down from there like a seal 1 that got left behind (see FIG. 13 in particular in combination with FIG. 10 and/or FIG. 11).

The disposal of seals 1 into a waste container 15 is not a necessary condition. It is also conceivable that seals 1, which are not damaged are fed back to the production process, that is, there is another try to mount said seal 1. In particular this applies to the cases shown in FIGS. 9 and 10. To this end, seals 1 in good condition may be fed back to the production process, whereas bad seals 1 are disposed. The curves in FIG. 8A may be the base for that decision. If a force-path progressions F over s according to curve C is detected, a seal 1 (if there is any) may be fed back, whereas seals 1 are disposed, when a force-path progressions F over s according to curve B is detected. If a force-path progressions F over s according to curve D is detected, the seal 1 may be disposed for safety reasons or it is inspected in another way (e.g. visually) to decide whether it is in good or bad condition.

Figure 14:
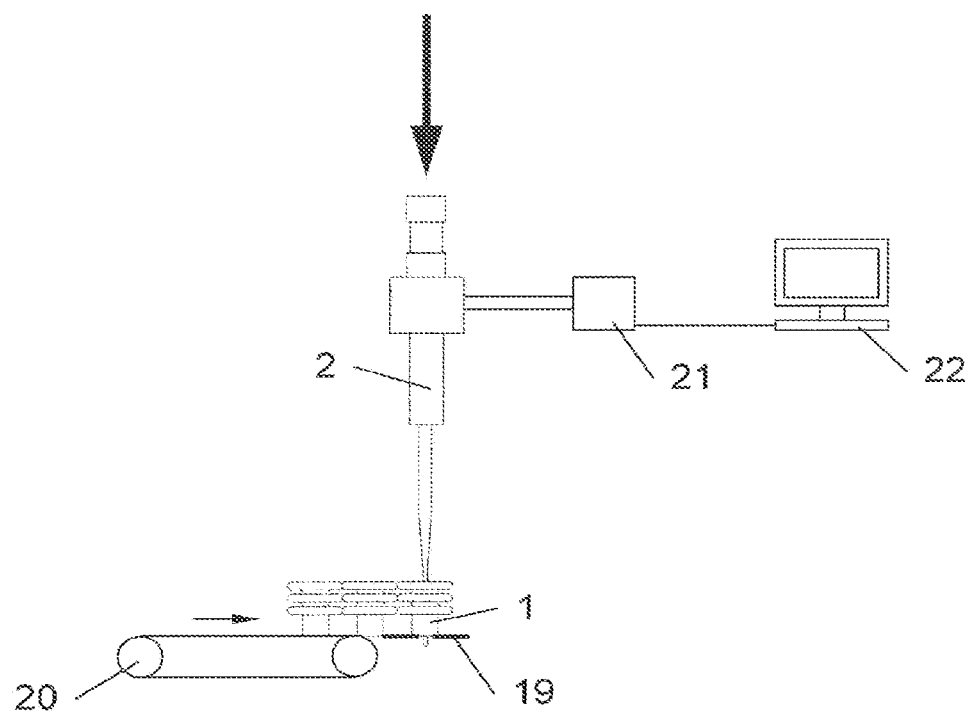

Finally, FIG. 14 shows further variants and details of the inventive device. A pinhole diaphragm 19 is shown, which facilitates picking up of the seal 1 by the holding arbor 2, that can protrude through the pinhole diaphragm 19. Furthermore, a conveyor 20 is provided, which feeds seals 1 into an accommodation position provided for accommodation via a transfer unit. Moreover, evaluation electronics 21 are shown, which are connected to the holding arbor 2, concretely to its sensor element 8. Finally, a computer 22 is operationally connected to the evaluation electronics 21 in FIG. 14 so as to execute evaluation algorithms for the decisions as to whether seals may be processed or must be separated out.

In conclusion, it should be noted that the constituents in the figures are not necessarily shown to scale, and that the individual variants depicted in the figures may also comprise the subject matter of independent invention. Positional indications like "right", "left", "upper", "lower" and the like relate to the position of the respective component shown, and must be mentally adjusted accordingly given a change in the specified position.

The invention was explained based on advantageous embodiments of the invention. The skilled reader may readily apply the disclosed instructions to other examples.

REFERENCE LABELS LIST

1 Seal
2 Holding arbor

3 Force and/or pressure transducer
4 Primary axis of holding arbor
5 Interface between two adjacent arbor parts
6 Complementary arbor part
7 Accommodation-side arbor
8 Bushing
9 Sensor element
10 Flat conductor
11 Assembly pipe
12 Seal chamber
13 Cable/wire
14 Pipe
15 Waste container
16 Slider
17 Shiftable stripper
18 Pivotable stripper
19 Pinhole diaphragm
29 Conveyor
21 Evaluation electronics
22 Computer
A Force-path progression given a properly accommodated seal
B Force-path progression given a destroyed seal
C Force-path progression given a missing seal
F Force
P Pressure
s Path
t Time

The invention claimed is:

1. A cable fitting transfer unit comprising, a holding arbor configured to accommodate cable fittings thereon; a conveyor configured to transport cable fittings to said holding arbor; a cable fitting fitter configured to receive cable fittings from said holding arbor; and, a force transducer operatively connected to measure accommodation force in said holding arbor during the accommodation of cable fittings, said force transducer being situated at said holding arbor.

2. The cable fitting transfer unit as claimed in 1, wherein, said force transducer is located within said holding arbor.

3. The cable fitting transfer unit as claimed in 2, further comprising, a first part of said holding arbor; a second part of said holding arbor being adjacent to said first part; and, an interface between said first and second parts, said force transducer being situated between said first and second parts of said holding arbor.

4. The cable fitting transfer unit as claimed in 3, further comprising, a bushing located at said interface between said first and second parts, said bushing having a first bushing part, said bushing having a second bushing part configured to screw-connect with said first bushing part.

5. The cable fitting transfer unit as claimed in 1, further comprising, a strain gauge included in said force transducer.

6. The cable fitting transfer unit as claimed in 1, further comprising, a capacitive sensor included in said force transducer.

7. The cable fitting transfer unit as claimed in 1, further comprising, a piezoelectric sensor included in said force transducer.

8. The cable fitting transfer unit as claimed in 7, further comprising, said piezoelectric sensor including a piezo disk, said piezo disk having first and second sides; a first conductor contacting said first side of said piezo disk; and, a second conductor contacting said second side of said piezo disk.

9. The cable fitting transfer unit as claimed in 1, further comprising, evaluation electronics configured to provide signals for reversing said holding arbor upon detection of a faultily-oriented cable fitting, said evaluation electronics being operatively connected to said force transducer.

* * * * *